United States Patent
Tanimura et al.

(10) Patent No.: US 10,707,499 B2
(45) Date of Patent: Jul. 7, 2020

(54) FUEL CELL CASSETTE AND FUEL CELL STACK

(71) Applicant: MORIMURA SOFC TECHNOLOGY CO., LTD., Komaki-shi, Aichi (JP)

(72) Inventors: Ryoji Tanimura, Nagoya (JP); Hiroshi Sumi, Ichinomiya (JP); Nobuyuki Hotta, Konan (JP)

(73) Assignee: MORIMURA SOFC TECHNOLOGY CO., LTD., Komaki-shi, Aichi (JP)

( * ) Notice: Subject to any disclaimer, the term of this patent is extended or adjusted under 35 U.S.C. 154(b) by 101 days.

(21) Appl. No.: 15/111,222

(22) PCT Filed: Jan. 13, 2015

(86) PCT No.: PCT/JP2015/050583
§ 371 (c)(1),
(2) Date: Jul. 13, 2016

(87) PCT Pub. No.: WO2015/108012
PCT Pub. Date: Jul. 23, 2015

(65) Prior Publication Data
US 2016/0336605 A1    Nov. 17, 2016

(30) Foreign Application Priority Data
Jan. 15, 2014   (JP) ................................. 2014-005505

(51) Int. Cl.
*H01M 8/0273*   (2016.01)
*H01M 8/2432*   (2016.01)
(Continued)

(52) U.S. Cl.
CPC ......... *H01M 8/0273* (2013.01); *H01M 8/006* (2013.01); *H01M 8/0297* (2013.01);
(Continued)

(58) Field of Classification Search
None
See application file for complete search history.

(56) References Cited

U.S. PATENT DOCUMENTS

| 2002/0106551 A1* | 8/2002 | Speranza | ................. C25B 9/08 429/130 |
| 2008/0171255 A1* | 7/2008 | Brantley | ............. H01M 8/0273 429/480 |

(Continued)

FOREIGN PATENT DOCUMENTS

| CA | 2898511 A1 | 11/2012 |
| JP | 2006-107868 A | 4/2006 |

(Continued)

OTHER PUBLICATIONS

Sumi (JP, 2012-230875) (a raw machine translation) (Abstract) (Year: 2012).*

(Continued)

*Primary Examiner* — Carmen V Lyles-Irving
(74) *Attorney, Agent, or Firm* — Sughrue Mion, PLLC (57) ABSTRACT

Provided is a fuel cell cassette capable of assuredly suppressing separator deformation and maintaining good battery characteristics. A fuel cell cassette (2) includes a flat plate-shaped single cell (11), a separator (12), a fuel electrode frame, an interconnector and an air electrode insulating frame (15) stacked together. In the fuel cell cassette (2), the separator (12) and the fuel electrode frame (13) are joined by welding. The air electrode insulating frame (15) has gas channels (75, 76) defined therein for flow of oxidant gas. The fuel cell cassette has a welding mark (77) formed on an exposed region of the separator (12) inside the gas channel (75, 76) such that the exposed region of the separator (12) is fixed to the fuel electrode frame by the welding mark (77).

8 Claims, 8 Drawing Sheets

(51) Int. Cl.
*H01M 8/00* (2016.01)
*H01M 8/0297* (2016.01)
*H01M 8/04082* (2016.01)
*H01M 8/124* (2016.01)

(52) U.S. Cl.
CPC ..... *H01M 8/04201* (2013.01); *H01M 8/2432* (2016.02); *H01M 2008/1293* (2013.01)

(56) References Cited

U.S. PATENT DOCUMENTS

| | | | | |
|---|---|---|---|---|
| 2010/0055525 | A1* | 3/2010 | Uematsu | H01M 8/248 429/480 |
| 2010/0209800 | A1* | 8/2010 | Yamanis | H01M 8/0247 429/457 |
| 2012/0107713 | A1 | 5/2012 | Miller et al. | |

FOREIGN PATENT DOCUMENTS

| | | |
|---|---|---|
| JP | 2009-9802 A | 1/2009 |
| JP | 2011-161450 A | 8/2011 |
| JP | 2012-190725 A | 10/2012 |
| JP | 2012-230875 A | 11/2012 |
| JP | 2013-33621 A | 2/2013 |
| JP | 2013-157179 A | 8/2013 |
| JP | 2013-175448 A | 9/2013 |
| WO | 2013/075032 A1 | 5/2013 |

OTHER PUBLICATIONS

Sumi (JP, 2012-230875) (a raw machine translation) (Detailed Description) (Year: 2012).*
Sumi (JP, 2012-230875) (a raw machine translation) (Drawings) (Year: 2012).*
Honma et al. (JP, 2005-190868) (a raw machine translation) (Abstract) (Year: 2005).*
Honma et al. (JP, 2005-190868) (a raw machine translation) (Detailed Description) (Year: 2005).*
Honma et al. (JP, 2005-190868) (a raw machine translation) (Drawings) (Year: 2005).*
International Search Report of PCT/JP2015/050583, dated Mar. 24, 2015. [PCT/ISA/210].
Communication dated Aug. 28, 2017, from European Patent Office in counterpart application No. 15737261.6.

* cited by examiner

FUEL CELL CASSETTE AND FUEL CELL STACK

CROSS REFERENCE TO RELATED APPLICATIONS

This application is a National Stage of International Application No. PCT/JP2015/050583 filed Jan. 13, 2015, claiming priority based on Japanese Patent Application No. 2014-005505, filed Jan. 15, 2014, the contents of all of which are incorporated herein by reference in their entirety.

FIELD OF THE INVENTION

The present invention relates to a fuel cell cassette in which a single cell, a separator, a frame and an interconnector are stacked together and to a fuel cell stack having stacked therein a plurality of fuel cell cassettes.

BACKGROUND ART

As a fuel cell, there is conventionally known a solid oxide fuel cell (abbreviated as "SOFC") having a solid electrolyte layer (solid oxide layer). The fuel cell is used in the form of a fuel cell stack having stacked therein a plurality of single cells, each of which serves as a minimum unit for power generation. The single cells are provided with air electrodes, fuel electrodes and solid electrolyte layers, respectively, and generate electric power by power generation reaction. The fuel cell stack includes, in addition to the single cells, a plurality of metal frames, insulating frames, separators and interconnectors stacked together.

The metal frames are formed of a conductive material such as stainless steel in a frame shape so as to surround peripheral surfaces of the single cells. The separators are formed of a conductive material such as stainless steel in a rectangular frame shape, with openings made in the centers thereof, and are joined to outer peripheries of the single cells so as to accommodate the single cells inside the openings of the separators. Herein, each of the separators functions as a partition plate to separate air and fuel chambers to which reaction gases (oxidant gas and fuel gas) are supplied. The interconnectors are formed of a conductive material such as stainless steel in a plate shape and are arranged on both sides of the single cells in a thickness direction so as to provide electrical conduction between the single cells.

In the case of assembling conventional flat solid oxide fuel cells (see, for example, Patent Document 1) into a fuel cell stack, it has been common practice to ensure the sealing of the fuel cell stack by a compression seal. However, the compression seal raises a concern that the utilization rate of reaction gases deteriorates due to high tendency of reaction gas leakage, excessive deformation of separators and the like.

Patent Document 2 discloses a fuel cell stack in which separators are joined by welding. It is effective to join the metal components (separators, metal frames, interconnectors etc.) of the fuel cell stack by welding into respective assembly units (called "fuel cell cassettes") for prevention of external leakage of the reaction gases.

The fuel cell stack has manifolds defined therein through which the reaction gases flow. More specifically, the manifolds are defined in the fuel cell stack so as to extend in a stacking direction of the single cells and, at the same time, provide communication with (e.g. divide into or gather from) the respective single cells. In other words, a plurality of openings are made in the separators, the metal frames and the interconnectors such that stack through holes of the manifolds are constituted by these openings. For joining of the separator, the metal frame and the interconnector, laser welding is performed around a periphery of the metal frame and peripheries of the openings. In the resulting fuel cell cassette, the fuel chamber-side anode space to which the fuel gas is supplied is sealed by such welding.

Figure 17:
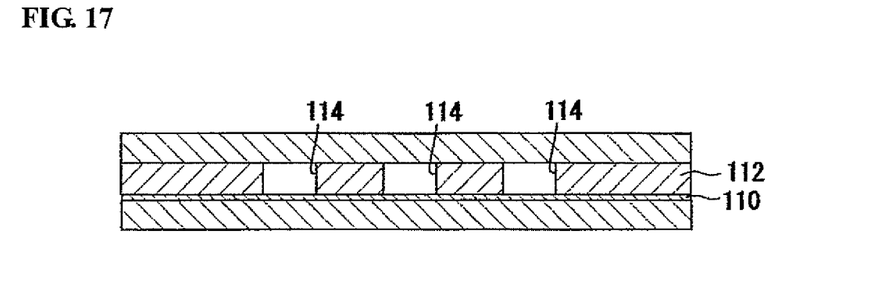
FIG. 17 is a cross-sectional view showing gas channels provided in a conventional insulating frame.

As shown in FIG. 17, the fuel cell stack further includes insulating frames 112 each formed of a mica sheet, at a position on the separator 110 and outside the cathode space (air chamber), and having formed therein gas channels 114 for flow of the oxidant gas (air).

PRIOR ART DOCUMENTS

Patent Documents

Patent Document 1: Japanese Laid-Open Patent Publication No. 2009-9802
Patent Document 2: Japanese Laid-Open Patent Publication No. 2011-161450

SUMMARY OF THE INVENTION

Problems to be Solved by the Invention

Figure 18:
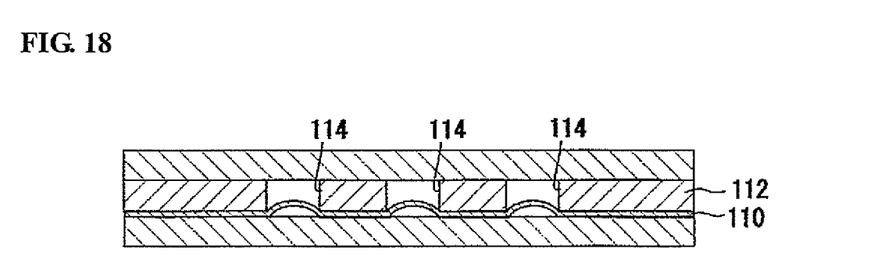
FIG. 18 is a cross-sectional view showing deformation of a separator in a narrow gas channel.
Figure 19:
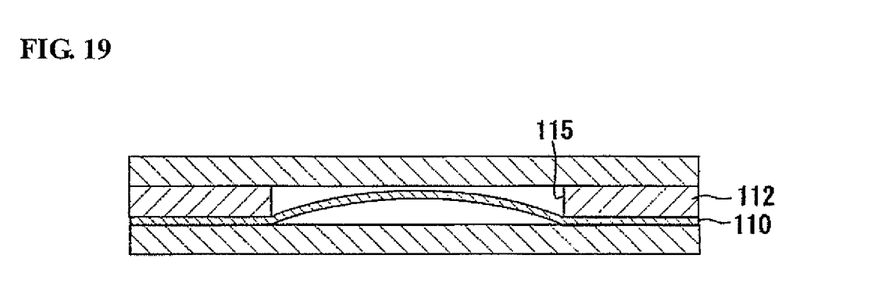
FIG. 19 is a cross-sectional view showing deformation of a separator in a wide gas channel.

The high-temperature type solid oxide fuel cell is operated at 1000° C. The medium-temperature type solid oxide fuel cell is operated at 700° C. to 800° C. When durability test is performed on the solid oxide fuel cell with the repeated application of such high-temperature heat, the separator 110 is deformed due to difference in thermal expansion coefficient between the components of the fuel cell cassette. In particular, a region of the separator 110 facing the gas channel 114 of the insulating frame 112 shows a large amount of deformation due to difference in thermal expansion coefficient and becomes deformed (e.g. bulged) toward the gas channel side so as to interfere with the flow of the oxidant gas as shown in FIG. 18. This results in non-uniform distribution of the oxidant gas to the air electrode and causes deterioration in the utilization rate of the oxidant gas. In the case where the separator 110 has a wide gas channel 115 as shown in FIG. 19, there is a fear that the power generation function of the fuel cell stack may be stopped upon the occurrence of a short circuit between the adjacent single cells by large deformation (e.g. bulging) of the separator 110.

The present invention has been made in view of the above problems. It is an object of the present invention to provide a fuel cell cassette and fuel cell stack capable of assuredly preventing separator deformation and maintaining good cell characteristics.

Means for Solving the Problems

As means (first aspect) for solving to the above problems, there is provided a fuel cell cassette, comprising: a single cell formed in a flat plate shape and having a fuel electrode, an air electrode and an electrolyte layer; a first frame formed in a frame shape and arranged to surround a peripheral surface of the single cell; a separator joined to a peripheral end portion of the single cell and located on one surface of the first frame so as to separate an oxidant gas contacting the air electrode and a fuel gas contacting the fuel electrode; and an interconnector formed in a plate shape and located on the other surface of the first frame opposite to the one surface on which the separator is located, wherein the separator and the first frame are joined by welding such that the first frame is located on one surface of the separator; and wherein the fuel cell cassette comprises: a second frame located on the other surface of the separator opposite to the one surface on which the first frame is located, the second frame having defined therein gas channels through which the oxidant gas or the fuel gas flows; and a welding part formed on an exposed region of the separator inside the gas channel so as to fix the exposed region of the separator to the first frame.

In the first aspect, the welding part is formed on the exposed region of the separator inside the gas channel of the second frame so that the exposed region of the separator is fixed to the first frame by the welding part. With such welding of the exposed region of the separator to the first frame, the separator is prevented from being deformed (e.g. bulged) inside the gas channel even in the case where there is a difference in thermal expansion coefficient between the first frame and the separator. It is thus possible to avoid the conventional problem that the flow of the reaction gas is interfered with by deformation of the separator inside the gas channel, whereby the fuel cell cassette avoids a variation in the flow of the reaction gas (oxidant gas or fuel gas) to the electrode of the single cell and allows efficient distribution of the reaction gas. Since the separator is not deformed inside the gas channel, it is possible to avoid the conventional problem that a short circuit occurs between the single cells due to deformation of the separator. Therefore, the fuel cell cassette prevents deterioration in the utilization rate of the reaction gas in the single cell and maintains good cell characteristics.

The welding part inside the gas channel may include a plurality of welding marks formed by the welding. By this welding part, it is possible to assuredly fix the exposed region of the separator to the first frame inside the gas channel.

The separator is generally smaller in thickness than the interconnector. In this case, it is likely that deformation (e.g. bulging) of the separator will occur. In the present invention, however, the separator is fixed to the first frame by the welding part. It is thus possible to assuredly suppress deformation of the separator inside the gas channel.

The welding part may include a linear welding mark formed by the welding in parallel to the direction of extension of the gas channel. By this welding part, it is possible to assuredly fix the separator to the first frame without the flow of the reaction gas being interfered with by the welding mark. Alternatively, the welding part may include a plurality of linear welding marks formed by the welding such that the welding marks intersect each other. It is also possible by this welding part to assuredly fix the separator to the first frame and suppress deformation of the separator inside the gas channel.

Openings are made in the first frame and the separator so as to define gas passages through which the oxidant gas and the fuel gas flow. By the welding, welding marks may be formed in a closed circuit shape so as to seal peripheries of the openings. Further, the welding part may include a linear welding mark formed by the welding so as to intersect the welding mark formed around the periphery of the opening. In the fuel cell cassette, a relatively large gas pressure (i.e. pressure of the reaction gas flowing through the gas passages) is exerted on the vicinity of the opening. It is however possible to, in such a vicinity region on which the relatively large gas pressure is exerted, assuredly fix the separator to the first frame and prevent deformation of the separator by allowing the welding part to intersect the welding mark around the periphery of the opening.

The welding of the separator and the first frame may be performed by welding process using a laser. As the laser, there can be used a fiber laser. Since the fiber laser is capable of focusing a laser beam to a small spot size, the line width of the welding mark can be controlled to 0.2 mm or smaller in the fiber laser welding process. It is thus possible by such laser welding process to assuredly weld the separator to the first frame while suppressing thermal distortion. The welding may alternatively performed by any welding process other than laser welding, such as resistance welding or brazing.

The thickness of the separator of the single cell is preferably in the range of 0.04 mm to 0.3 mm. When the thickness of the separator is smaller than 0.04 mm, the separator may become low in durability. When the thickness of the separator is greater than 0.3 mm, the separator becomes less deformable so that it is difficult to cause following deformation of the separator in an out-of-plane direction of the single cell. This leads to a fear of cracking in the electrode. It is possible to assuredly separate the oxidant gas and the fuel gas by setting the thickness of the separator to within the range of 0.04 mm to 0.3 mm.

The gas channel in which the welding part is formed may be the one for flow of the oxidant gas or for flow of the fuel gas. In the case where the welding part is formed in the oxidant gas channel, it is possible to ensure the reliable flow of the oxidant gas through the gas channel and prevent deterioration in the utilization rate of the oxidant gas. In the case where the welding part is formed in the fuel gas channel, it is possible to endure the reliable flow of the fuel gas through the gas channel and prevent deterioration in the utilization rate of the fuel gas.

For example, the first frame of the fuel cell cassette is a metal frame formed of a metal plate in a rectangular frame shape; whereas the second frame of the fuel cell cassette is an insulating frame formed of an insulating material, as exemplified by a mica frame formed of mica in a rectangular frame shape.

In the case where an inner edge of the first frame is arranged to protrude more toward the cell side than an inner edge of the second frame, the welding part may include a linear laser welding mark formed so as to protrude more toward the cell side than the inner edge of the second frame. It is possible in this case to, in the vicinity of an inlet or outlet of the gas channel of the second frame, fix the separator to the first frame by the laser welding mark and assuredly prevent deformation of the separator.

In the case where the inner edge of the second frame is arranged to protrude more toward the cell side than the inner edge of the first frame, the welding mark may include a linear laser welding mark formed so as not to protrude more toward the cell side than the inner edge of the second frame. In this case, it is possible to avoid performing the laser welding at a location where the first frame does not exist.

As another means (second aspect) for solving the above problems, there is provided a fuel cell stack comprising a plurality of fuel cell cassettes according to the first aspect.

In the second aspect, it is possible to prevent deterioration in the utilization rate of the reaction gas in the fuel cell cassette and achieve efficient power generation.

Manifolds are defined in the fuel cell cassettes. The manifolds include vertical hole parts extending in a stacking direction of the fuel cell cassettes and horizontal hole parts connected to the vertical hole parts and extending in a direction perpendicular to the staking direction so as to divide or collect gas paths to the respective single cells. The welding parts are formed in the exposed regions of the separators inside the horizontal hole parts of the manifolds.

The welding part may include a linear laser welding mark formed in a direction perpendicular to the direction of extension of the horizontal hole part or a linear laser welding mark formed in a direction inclined relative to the direction of extension of the horizontal hole part. Alternatively, the welding part may include laser welding marks intersecting longitudinally and laterally in a mesh pattern. As another alternative, the welding part may include laser welding marks spaced longitudinally and laterally at predetermined intervals in a dot pattern. Further, the welding part may include a laser welding mark formed over two or more horizontal hole parts. By forming the welding part as mentioned above, it is possible to assuredly fix the exposed region of the separator to the first frame and suppress deformation of the separator inside the gas channel.

DESCRIPTION OF EMBODIMENTS

A fuel cell according to one embodiment of the present invention will be described in detail below with reference to the drawings.

Figure 1:
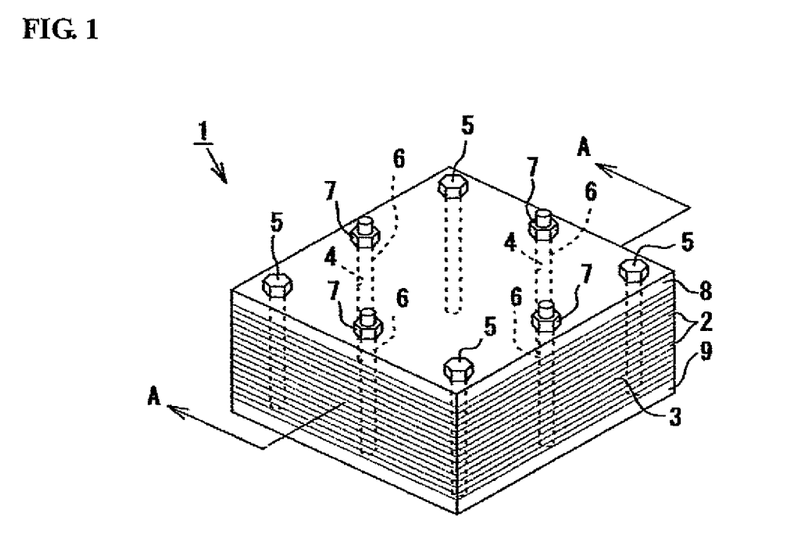
FIG. 1 is a schematic perspective view of a fuel cell according to one embodiment of the present invention.
Figure 2:
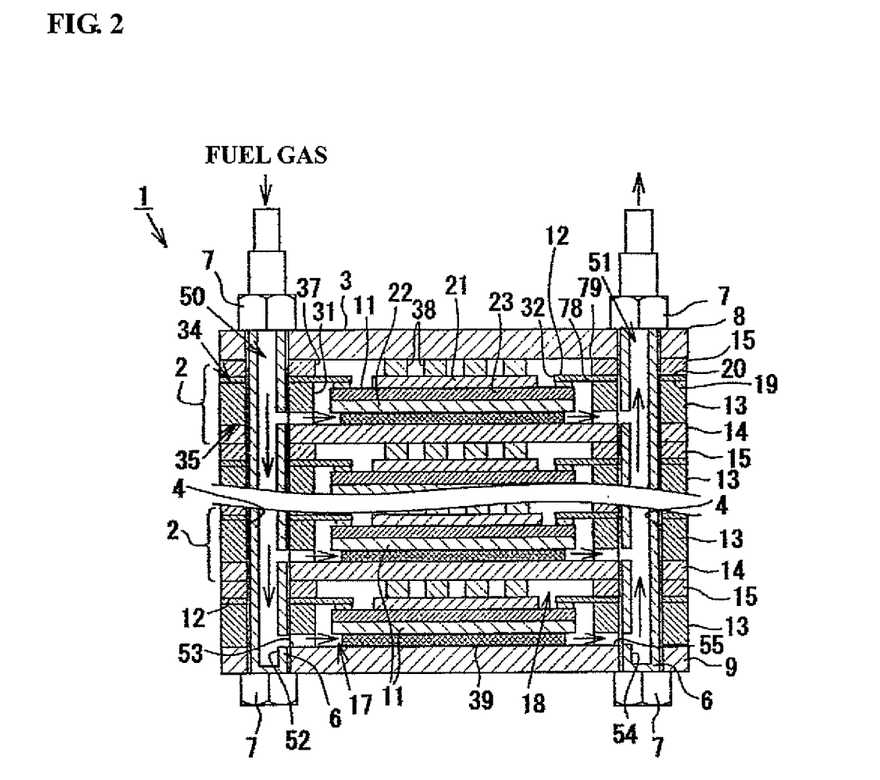
FIG. 2 is a cross-sectional view of the fuel cell taken along line A-A of FIG. 1.

As shown in FIGS. 1 and 2, the fuel cell 1 is configured as a solid oxide fuel cell (SOFC) and used in the form of a fuel cell stack 3 in which a plurality of (e.g. twenty) fuel cell cassettes 2 are stacked together. The fuel cell stack 3 has a substantially rectangular parallelepiped shape with a length of 180 mm, a width of 180 mm and a thickness of 80 mm. Eight through holes 4 are formed in the fuel cell stack 3 in a thickness direction of the fuel cell stack 3. Fastening bolts 5 are inserted through four of the through holes 4 in the four corners of the fuel cell stack 3, with bottom-side end portions of the fastening bolts 5 protruding from a bottom surface of the fuel cell stack 3. Nuts (not illustrated) are screwed onto the bottom-side end portions of the fastening bolts 5. Gas-flow fastening bolts 6 are inserted through the other four through holes 4 of the fuel cell stack 3, with top- and bottom-side end portions of the gas-flow fastening bolts 6 protruding from top and bottom surfaces of the fuel cell stack 3. Nuts 7 are screwed onto the top- and bottom-side end portions of the gas-flow fastening bolts 6. As a result of such screw fastening, the plurality of fuel cell cassettes 2 are fixed in position within the fuel cell stack 3.

Figure 3:
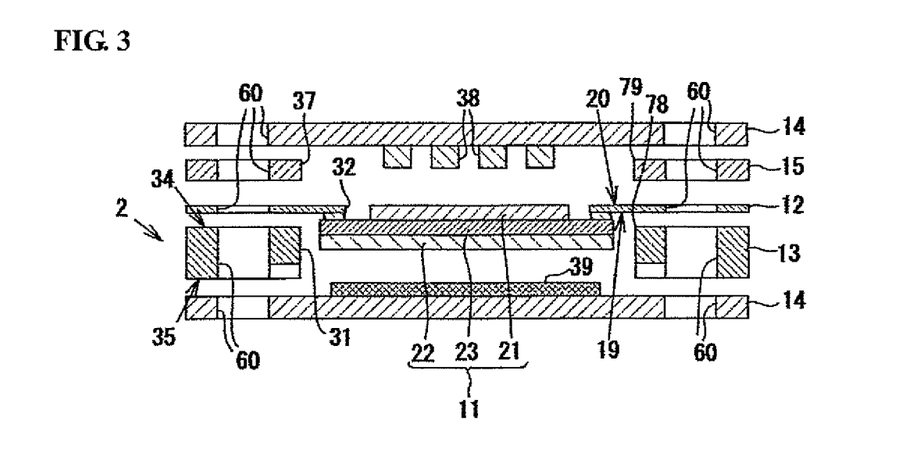
FIG. 3 is an exploded sectional view of a fuel cell cassette according to one embodiment of the present invention.

As shown in FIGS. 2 and 3, each of the fuel cell cassettes 2 is formed as a joint assembly including a plate-shaped single cell 11 as a minimum unit for power generation, a separator 12, a fuel electrode frame 13 (as a first frame) and an interconnector 14 stacked and other and joined together by welding. Each of the fuel cell cassettes 2 further includes an air electrode insulating frame 15 (as a second frame) located on a surface 20 (upper side in FIG. 2) of the separator 12 opposite to a surface 19 (lower side in FIG. 2) on which the fuel electrode frame 13 is located.

The single cell 11 has an air electrode 21, a fuel electrode 22 and a solid electrolyte layer 23 and generates electric power by power generation reaction. The fuel electrode frame 13 is a metal frame formed of a conductive material (such as metal plate of stainless steel) in a substantially rectangular frame shape having a thickness of about 2 mm thickness and is arranged to surround a peripheral surface of the single cell 11. Namely, a rectangular opening 31 is made through the center of the fuel electrode frame 13 in the thickness direction such that the single cell 11 is situated inside the opening 31.

The separator 12 is formed of a conductive material (such as metal plate of stainless steel) in a substantially rectangular frame shape having a thickness of about 0.1 mm, with a rectangular opening 32 made in the center of the separator 12, and is brazed to a peripheral end portion of the single cell 11 (solid electrolyte layer 23) by a silver-containing brazing material at a location on one surface 34 (upper side in FIG. 2) of the fuel electrode frame 13. The separator 12 function as a partition plate between the cells 11 to separate an oxidant gas (air) contacting the air electrode 21 and a fuel gas contacting the fuel electrode 22.

The interconnector 14 is formed of a conductive material (such as metal plate of stainless steel) in a substantially rectangular plate shape having a thickness of about 0.8 mm and is located on the other surface 35 (lower side in FIG. 2) of the fuel electrode frame 13 opposite to the surface 34 on which the separator 12 is located.

When the plurality of fuel cell cassettes 2 are stacked together in the fuel cell stack 3, a pair of ends plates 8 and 9 are disposed on both sides of the fuel cell stack 3 in the thickness direction of the single cells 11. The respective interconnectors 14 arranged to not only define gas channels but also provide electrical conduction between the adjacent single cells 11. The interconnector 14 between the adjacent single cells 11 divides these adjacent single cells 11. The end plates 8 and 9 are arranged to hold the fuel cell stack 3 therebetween and function as output terminals for output of electric current from the fuel cell stack 3. In the present embodiment, the end plates 8 and 9 are made greater in thickness than the interconnectors 14.

The air electrode insulating frame 15 is formed of a mica sheet in a substantially rectangular frame shape having a thickness of about 1.0 mm, with a rectangular opening 37 made in the center of the air electrode insulating frame 15 in the thickness direction.

The solid electrolyte layer 23 of the single cell 11 is formed of a ceramic material (oxide) such as yttria-stabilized zirconia (YSZ) in a substantially rectangular plate shape having a thickness of about 0.01 mm and is fixed to a bottom-side surface of the separator 12 so as to close the opening 32 of the separator 12. The solid electrolyte layer 23 serves as an oxygen ion conducive solid electrolyte body.

The air electrode 21 is placed on a top-side surface of the solid electrolyte layer 23 such that the oxidant gas supplied to the fuel cell stack 3 comes into contact with the air electrode 21. The fuel electrode 22 is placed on a bottom-side surface of the solid electrolyte layer 23 such that the fuel gas supplied to the fuel cell stack 3 comes into contact with the fuel electrode 22. Namely, the air electrode 21 and the fuel electrode 22 are located on the opposite surfaces of the solid electrolyte layer 23. The air electrode 21 is situated inside the opening 32 of the separator 12 and kept from contact with the separator 12. In the present embodiment, a fuel chamber 17 is defined on the bottom side of the separator 12 by the opening 31 of the fuel electrode frame 13, the interconnector 14 and the like; and an air chamber 18 is defined on the top side of the separator 12 by the opening 37 of the air electrode insulating frame 15, the interconnector 14 and the like.

In the present embodiment, the air electrode 21 of the single cell 11 is formed of a composite metal oxide LSCF ($La_{0.6}Sr_{0.4}Co_{0.2}Fe_{0.8}O_3$) in a rectangular plate shape; and the fuel electrode 22 of the single cell 11 is formed of a mixture of nickel and yttria-stabilized zirconia (Ni—YSZ) in a rectangular plate shape. In the single cell 11, the air electrode 21 and the fuel electrode 22 function as a cathode layer and an anode layer, respectively. The air electrodes 21 are electrically connected to the interconnectors 14 by air electrode collectors 38, whereas the fuel electrodes 22 are electrically connected to the interconnectors 14 by fuel electrode collectors 39.

The fuel cell stack 3 (fuel cell cassettes 2) has manifolds formed therein through which the oxidant gas and the fuel gas flow. The manifolds of the fuel cell stack 3 each includes a vertical hole part extending in a stacking direction of the fuel cell cassettes 2 and a horizontal hole part connected to the vertical hole part and extending in a direction perpendicular to the stacking direction so as to divide or collect gas paths to the respective single cells.

More specifically, the fuel cell stack 3 has, formed therein as the manifolds, a fuel supply passage 50 for supplying the fuel gas to the fuel chambers 17 of the respective single cells 11 and a fuel discharge passage 51 for discharging the fuel gas from the fuel chambers 17 of the respective single cells 11 as shown in FIG. 2. The fuel supply passage 50 includes a fuel supply hole 52 (as the vertical hole part) extending axially through the center of the gas-flow fastening bolt 6 and fuel supply horizontal holes 53 (as the horizontal hole part) providing communication between the fuel supply hole 52 and the fuel chamber 17. The fuel discharge passage 51 includes a fuel discharge hole 54 (as the vertical hole part) extending axially through the center of the gas-flow fastening bolt 6 and fuel discharge horizontal holes 55 (as the horizontal hole part) providing communication from the fuel discharge hole 54 and the fuel chamber 17. The fuel gas flows into the fuel chamber 17 through the fuel supply hole 52 and then through the fuel supply horizontal holes 53 and flows out of the fuel chamber 17 through the fuel discharge horizontal holes 55 and then through the fuel discharge hole 54.

The fuel cell stack 3 also has, formed therein as the manifolds, an air supply passage (not shown) for supplying the air to the air chambers 18 of the respective single cells 11 and an air discharge passage (not shown) for discharging the air from the air chambers 18 of the respective single cells 11. The air supply passage has substantially the same structure as the fuel supply passage 50 and includes an air supply hole (not shown) extending axially through the center of the gas-flow fastening bolt 6 and air supply horizontal holes (not shown) providing communication between the air supply hole and the air chamber 18. The air discharge passage has substantially the same structure as the fuel discharge passage 51 and includes an air discharge hole (not shown) extending axially through the center of the gas-flow fastening bolt 6 and air discharge horizontal holes (not shown) providing communication from the air discharge hole and the air chamber 18. The air flows into the air chamber 18 through the air supply hole (as the vertical hole part) and then through the air supply horizontal holes (as the horizontal hole part) and flows out of the air chamber 18 through the air discharge horizontal holes (as the horizontal hole part) and then through the air discharge hole (as the vertical hole part).

Figure 4:
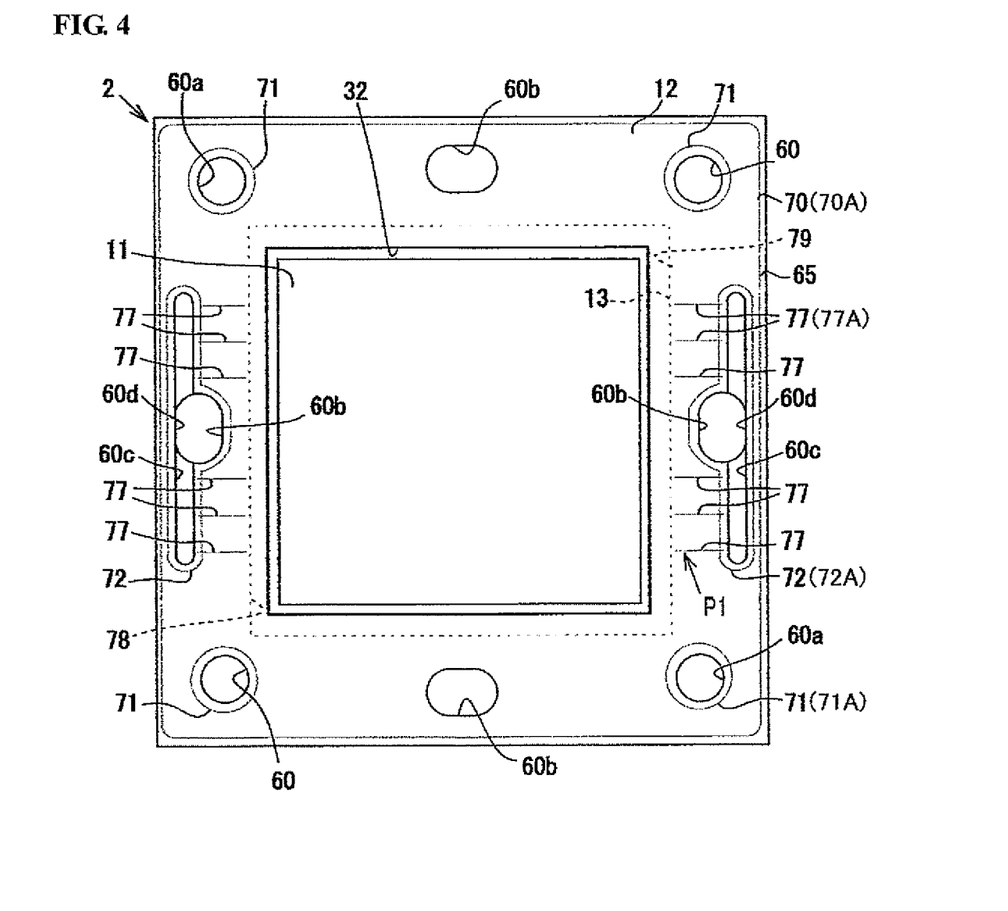
FIG. 4 is a plan view showing welding marks on a separator of the fuel cell cassette according to the one embodiment of the present invention.

In the present embodiment, the plate-shaped metal components of the fuel cell cassette 2, such as separator 12, fuel electrode frame 13 and interconnector 14, are joined together by laser welding. In FIG. 4, welding parts (welding marks 70 to 72 and 77) between the separator 12 and the fuel electrode frame 13 are shown from the side of the separator 12.

In addition to the opening 32 made in the center of the separator 12, a plurality of openings 60 are made in a peripheral part of the separator 12 as shown in FIG. 4. A plurality of openings 60 are made at the same positions in the fuel electrode frame 13, the interconnector 14 and the air electrode insulating frame 15 (see FIG. 3). Each of the openings 60 constitutes a portion of the through hole 4 in which the fastening bolt 5 or the gas-flow fastening bolt 6 is inserted (see FIG. 2). These openings 60 include circular openings 60*a* and oval openings 60*b*.

The oval openings 60*b* of the separator 12 and the fuel electrode frame 13 are provided to define the above-mentioned manifolds. More specifically, the oval openings 60*b* shown on the upper and lower sides of the separator 12 in FIG. 4 are provided to define the gas passage for supply of the fuel gas (i.e. fuel supply passage 50) and the gas passage for discharge of the fuel gas (i.e. fuel discharge passage 51), respectively. The oval openings 60b shown on the left and right sides of the separator 12 in FIG. 4 are provided to define the gas passage for supply of the oxidant gas (i.e. air supply passage) and the gas passage for discharge of the oxidant gas (i.e. air discharge passage), respectively. Further, elongated openings 60c are made extending from the left and right oval openings 60b toward the upper and lower sides in the figure. These openings 60b and 60c form branched openings 60d as branch points between the vertical and horizontal hole parts of the manifolds. The oval openings 60b correspond to the vertical hole parts of the manifolds. The horizontally elongated openings 60c correspond to the horizontal hole parts of the manifolds.

By the laser welding of the separator 12 to the fuel electrode frame 13, the welding mark 70 (laser welding mark) is formed in a closed circuit shape along an outer periphery 65 of the separator 12. The welding marks 71 and 72 (laser welding marks) are also formed in a closed circuit shape around the peripheries of the openings 60 (60a, 60d) of the separator 12 by the laser welding. The closed circuit-shaped welding marks 71 are formed along the peripheries of the openings 60a, whereas the closed circuit-shaped welding marks 72 are formed along the peripheries of the branched openings 60d. By the laser welding of the interconnector 14 to the fuel electrode frame 13, welding marks are formed in a closed circuit shape on the interconnector 14 in the same manner as above. In the present embodiment, the line width of the welding marks 70 to 72 on the surfaces of the separator 12 and the interconnector 14 is about 0.1 mm.

As mentioned above, the components 12 to 14 of the fuel cell cassette 2 are joined together by laser welding the separator 12 to the top-side surface 34 of the fuel electrode frame 13 and by laser welding the interconnector 14 to the lower surface 35 of the fuel electrode frame 13. Since the openings 60 and the outer periphery 65 are sealed by the closed circuit-shaped welding marks 71 and 72, the fuel chamber 17 is defined as a closed space inside the fuel cell cassette 2.

Figure 5:
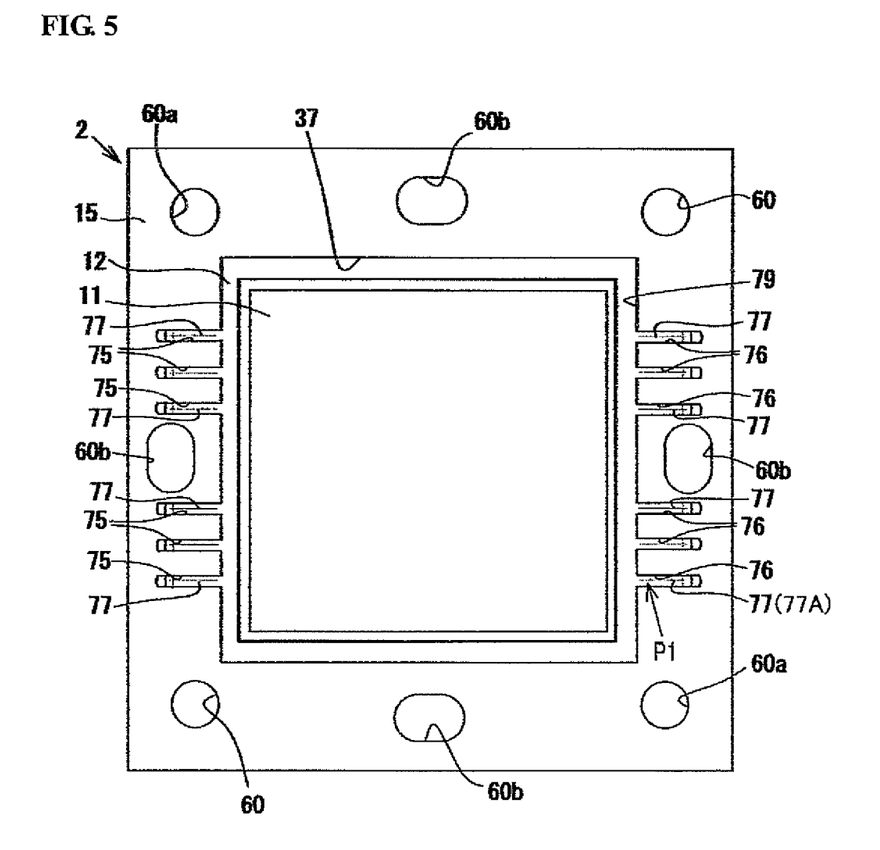
FIG. 5 is a plan view of the fuel cell cassette, showing gas channels and welding marks, according to the one embodiment of the present invention.
Figure 6:
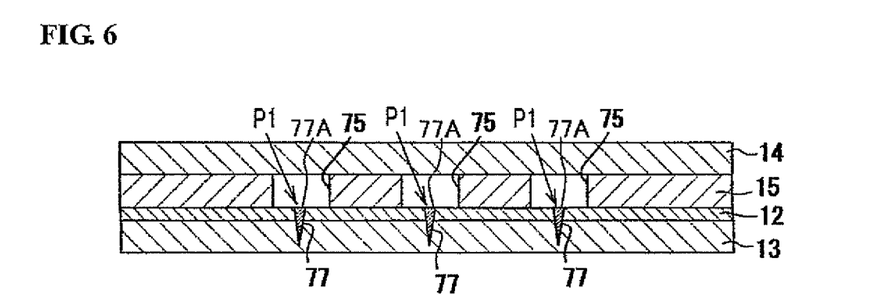
FIG. 6 is a cross-sectional view showing the welding marks on exposed regions of the separator inside the gas channels.

Further, a plurality of gas channels 75 and 76 (air supply and discharge horizontal holes 75 and 76 as the horizontal hole parts) are defined in the air electrode insulating frame 15 for flow of the oxidant gas as shown in FIG. 5. In the present embodiment, three gas channels 75, 76 are defined on each of the upper and lower sides of the left and right oval openings 60b (air supply and discharge holes). These gas channels have a width of about 1.5 mm and a length of about 15 mm. As shown in FIGS. 4 to 6, the linear welding marks 77 (laser welding marks as the welding parts) are formed by the laser welding on regions of the separator 12 exposed inside the gas channels 75 and 76. One welding mark 77 is provided to one gas channel 75, 76 so as to extend linearly in parallel to the direction of extension of the gas channel 75, 76. The line width of the welding marks 77 is about 0.1 mm. By these welding marks 77, the regions of the separator 12 exposed inside the gas channels 75 and 76 are fixed to the fuel electrode frame 13.

Each of the welding marks 77 is formed such that: one end portion of the welding mark 77 intersects the closed circuit-shaped welding mark 72, which seals the periphery of the branched opening 60 d; and the other end portion of the welding mark 77 does not protrude more toward the cell side than an inner edge 78 of the fuel electrode frame 13. In the case where the welding mark 77 is formed so as not to protrude toward the cell side, the laser welding is avoided from being performed at a location where the fuel electrode frame 13 does not exist. Herein, the dimensions of the air electrode insulating frame 15 are made substantially equal to the dimensions of the fuel electrode frame 13 so that the position of an inner edge 79 of the air electrode frame 15 agrees with the position of the inner edge 78 of the fuel electrode frame 13.

The above-configured fuel cell 1 allows a flow of the fuel gas into the fuel chamber 17 through the fuel supply passage 50 and a flow of the air into the air chamber 18 through the air supply passage (including the gas channels 75) while being heated to an operation temperature (of about 700° C.). Then, hydrogen in the fuel gas and oxygen in the air react with each other (as power generation reaction) through the solid electrode layers 23 to generate direct current power between the air electrodes 21 as the cathode layers and the fuel electrodes 22 as the anode layers. Since the plurality of single cells 11 are stacked in series in the fuel cell stack 3 in the present embodiment, the top- and bottom-side end plates 8 and 9 are connected to the air electrode 21 and the fuel electrode 22 and utilized as the cathode and the anode, respectively.

Next, a manufacturing method of the fuel cell 1 will be explained below.

The single cells 11 are each formed by a known conventional method and, more specifically, laminating a green sheet for formation of the solid electrolyte layer 23 on a green sheet for formation of the fuel electrode 22, sintering the green sheet laminate, printing a material for formation of the air electrode 21 on the solid electrolyte layer 23 of the sintered body, and then, sintering the printed electrode material.

Next, the separators 12, the fuel electrode frames 13 and the interconnectors 14 are each formed with openings 60 by die-cutting a stainless plate. The air electrode insulating frames 15 are each formed by processing a mica sheet into a predetermined shape and, more specifically, cutting a commercially available mica sheet (formed from a composite of mica and molding resin) into substantially the same outer shape as the other members (such as fuel electrode frame 13). At this time, a plurality of openings 60 (60a, 60b) and gas channels 75 and 76 are cut in the air electrode insulating frame 15. The resin contained in the mica sheet is vaporized by heat treatment after stacking of the air electrode insulating frame on the other components. The mica sheet is adapted to, when the fuel cell cassettes 2 are fastened by the bolts in the stacking direction, be interposed between the other components (separator 12 and interconnector 14) and thereby seal the respective components.

Figure 7:
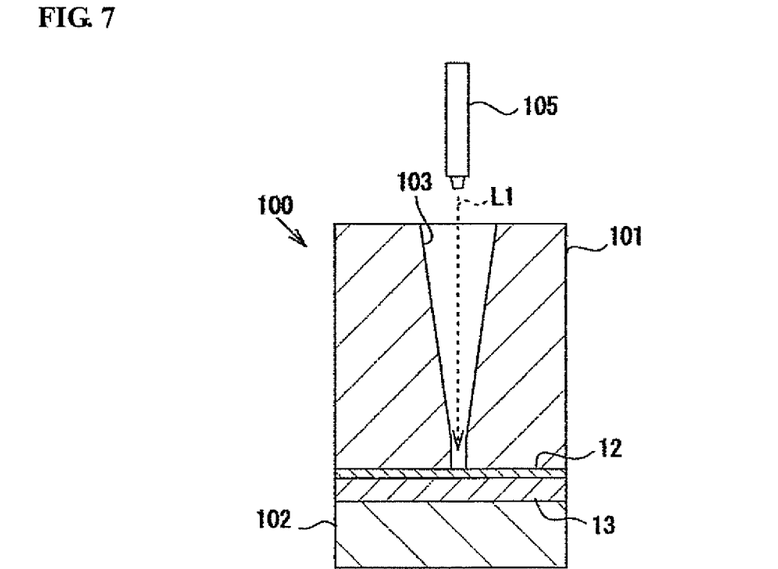
FIG. 7 is a cross-sectional view of a welding jig unit.

The separator 12, the fuel electrode frame 3 and the interconnector 14 are joined together by laser welding. More specifically, the laser welding is performed as follows. As shown in FIG. 7, the separator 12 and the fuel electrode frame 13 are placed in a welding jig unit 100 (between upper and lower jigs 101 and 102) so as to overlap each other with the openings 60 of the separator 12 and the fuel electrode frame 13 being aligned with each other (as a placement step). Then, the separator 12 and the fuel electrode frame 13 are fixed by fastening the upper and lower jigs 101 and 102 with a fixing member (such as bolt, nut or clamp; not shown).

In the welding jig unit 100, an opening 103 is made in the upper jig 101 such that a welding zone is exposed through the opening 103. A laser beam L1 is emitted by a laser emission device 105 to the weld zone through the opening 103 of the upper jig 101 under predetermined emission conditions (e.g. of an output of 150 W and a beam diameter of about 0.1 mm) (as a welding step). Herein, the laser beam L1 is emitted from the separator 12 side. An emitter such as fiber laser can be used as the laser emission device 105. The fiber laser is a solid-state laser that emits a laser beam L1 of 1080 nm wavelength. By horizontally moving the welding jig unit 100 with an X-Y table (not shown), the laser beam L1 is emitted along the opening 103 of the upper jig 101.

In the present embodiment, the welding step is performed in two stages with the use of two kinds of welding jigs 101. First, the laser beam L1 is emitted along the opening 103 of the first upper jig 101 so as to form the closed circuit-shaped laser welding mark 70 around the outer periphery 65 of the separator 12 and form longitudinal line segments of the laser welding marks 72 around the peripheries of the branched openings 60d. After that, the first upper jig 101 is replaced with the second upper jig 101. Next, the laser beam L1 is emitted along the opening 103 of the second upper jig 101 so as to form the laser welding marks 71 around the peripheries of the circular openings 60a and form any segments other than the longitudinal line segments (i.e. curved line segments) of the laser welding marks 72 around the peripheries of the branched openings 60d. At this time, the laser beam L1 is also emitted to the regions of the separator 12 to be exposed inside the gas channels 75 and 76 such that the linear laser welding marks 77 (welding part) are fainted to fix these regions of the separators 12 to the fuel electrode frame 13. Consequently, the separator 12 and the fuel electrode frame 13 are welded to each other.

After the above laser welding step, the resulting assembly of the separator 12 and the fuel electrode frame 13 is taken out of the welding jig unit 100. The separator 12 is then fixed to the solid electrolyte layer 23 of the single cell 11 by brazing. More specifically, the separator 12 and the solid electrolyte layer 23 are joined to each other by applying a brazing material to the separator 12 and the solid electrolyte layer 23 and melting the brazing material under heating at e.g. 850 to 1100° C.

Subsequently, the interconnector 14 is joined to the surface 35 side (bottom side) of the fuel electrode frame 13 with the use of the same welding jig unit as above. Herein, the laser beam L1 is emitted by the laser emission device 105 from the interconnector 14 side. Since the interconnector 14 is greater in thickness than the separator 12, the interconnector 14 is laser-welded to the fuel electrode frame 13 by emitting the laser beam L1 at an output of 300 W. There is thus obtained the joint assembly of the metal components 12 to 14 for production of the fuel cell cassette 2.

The joint assembly of the metal components 12 to 14 is stacked and mounted on the air electrode insulating frame 15, thereby producing the fuel cell cassette 2. The thus-produced fuel cell cassettes 2 are stacked together and combined into one as the fuel cell stack 3. The fastening bolts 5 are inserted through the four through holes 4 in the four corners of the fuel cell stack 3. The nuts (not shown) are screwed onto the bottom-side protruding end portions of the fastening bolts 5. The gas-flow fastening bolts 6 are inserted through the other four through holes 4 of the fuel cell stack 3. The nuts 7 are screwed onto the top- and bottom-side protruding end portions of the gas-flow fastening bolts 6. As a result, the fuel cell cassettes 2 are fixed in position within the fuel cell stack 3. In this way, the fuel cell 1 is completed.

The present embodiment provides the following effects.

(1) In the present embodiment, the fuel cell cassette 2 is characterized in that: the gas channel 75, 76 is defined in the air electrode insulating frame 15; and the welding mark 77 is formed on the exposed region of the separator 12 inside the gas channel 75, 76 such that the exposed region of the separator 12 is fixed to the fuel electrode frame 13 by the welding mark 77. With such a structure, the separator 12 is prevented from being deformed (e.g. bulged) inside the gas channel 75, 76 even in the case where there is a difference in thermal expansion coefficient between the fuel electrode frame 13 and the separator 12. It is thus possible to avoid the conventional problem that the flow of the reaction gas is interfered with by deformation of the separator 12 inside the gas channel 75, 76 whereby the fuel cell cassette avoids a variation in the flow of the oxidant gas to the air electrode 21 of the single cell 11 and allows efficient distribution of the oxidant gas. Since the separator 12 is not deformed inside the gas channel 75, 76, it is possible to avoid the conventional problem that a short circuit occurs between the single cells 11 due to deformation of the separator 12. Therefore, the fuel cell cassette prevents deterioration in the utilization rate of the oxidant gas in the single cell 11 and maintains good cell characteristics.

(2) In the fuel cell cassette 2, the separator 12 is made smaller in thickness than the interconnector 14 in the present embodiment. In this case, it is likely that deformation (e.g. bulging) of the separator 12 will occur. In the present embodiment, however, the separator 12 is fixed to the fuel electrode frame 13 by the welding marks 77. It is thus possible to assuredly suppress deformation of the separator 12 inside the gas channel 75, 76.

(3) Further, the linear straight welding mark 77 is formed in parallel to the direction of extension of the gas channel 75, 76 in the fuel cell cassette 2. It is thus possible to assuredly fix the separator 12 to the fuel electrode frame 13 without the flow of the oxidant gas being interfered with by the welding mark 77.

(4) In the fuel cell cassette 2, the openings 60 (60a, 60d) are made in the separator 12 and the fuel electrode frame 13 so as to define gas passages through which the oxidant gas and the fuel gas flow, respectively; the welding marks 71 and 72 are formed in a closed circuit shape so as to seal the peripheries of the openings 60; and the welding marks 77 are formed in the gas channels 75 and 76 so as to intersect the welding marks 71 and 72 formed around the peripheries of the branched openings 60d. A relatively large gas pressure (i.e. pressure of the oxidant gas flowing through the gas passages) is exerted on the vicinities of the branched openings 60d in the fuel cell cassette 2. It is however possible to, in such vicinity regions on which the relatively large gas pressure is exerted, assuredly fix the separator 12 to the fuel electrode frame 13 and prevent deformation of the separator 12 by allowing the welding parts 77 to intersect the welding marks 72 around the peripheries of the branched openings 72.

(5) In the present embodiment, the welding of the separator 12 and the fuel electrode frame 13 is done by mean of the fiber laser. Since the fiber laser is capable of focusing a laser beam to a small spot size, the line width of the welding mark 70 to 72 and 77 can be controlled to about 0.1 mm in the fiber laser welding process. It is thus possible to assuredly weld the separator 12 to the fuel electrode frame 13, while suppressing thermal distortion, and ensure the sufficient sealing of the fuel cell cassette 2. Further, the adoption of the fiber laser enables a reduction in the size of the laser emission device 105.

(6) In the welding step, the laser beam L1 is emitted around the peripheries of the openings 60 such that the closed-circuit shaped laser welding marks 71 and 72 are formed to seal the peripheries of the openings 60. At this time, the laser beam L1 is also emitted to the region of the separator 12 to be exposed inside the gas channel 75, 76 such that the welding mark 77 is formed to fix the exposed region of the separator 12 to the fuel electrode frame 13. Accordingly, the gas sealing of the peripheries of the openings 60 and the fixing of the separator 12 are accomplished by the same laser welding operation. It is thus possible to efficiently produce the fuel cell cassette 2. In the present embodiment, the laser welding is performed in two stages with the use of two kinds of upper jigs 101 such that the longitudinal line segments of the laser welding mark 72 and the welding mark 77 intersecting the longitudinal line segment of the laser welding mark 72 are formed separately. It is possible by such a welding process to ensure the formation of the intersection between the laser welding mark 72 and the welding mark 77.

The following modifications can be made to the present embodiment.

Figure 8:
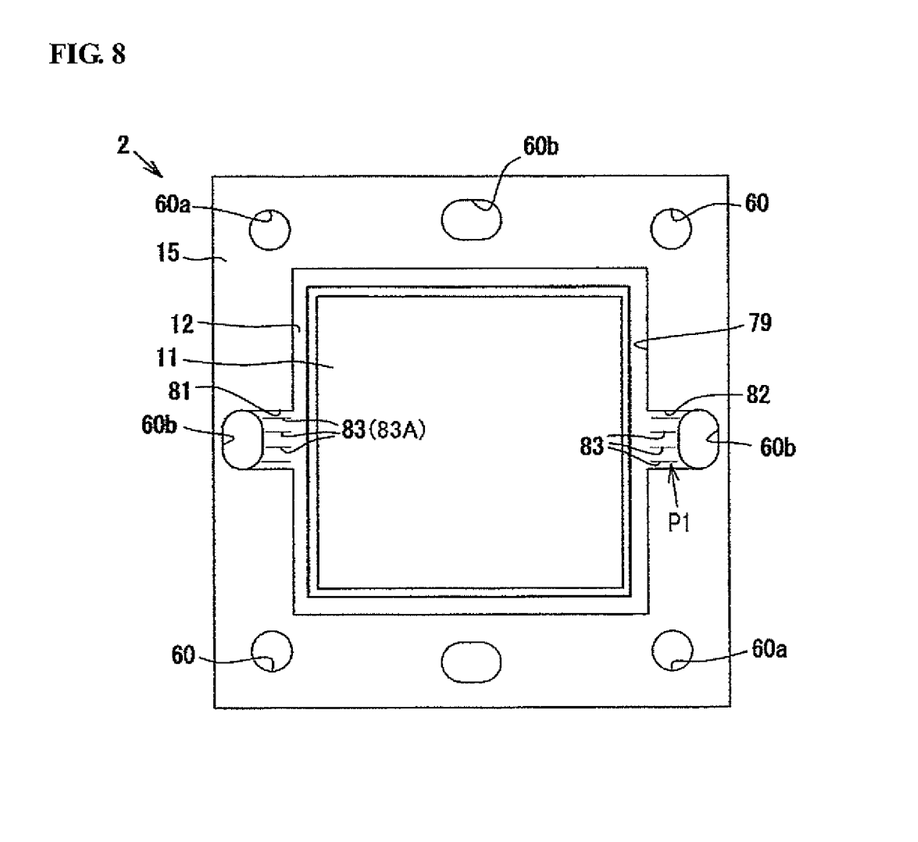
FIG. 8 is a plan view of a fuel cell cassette, in which a plurality of welding marks are formed in one gas channel, according to another embodiment of the present invention.

In the above embodiment, one welding mark 77 is provided to one gas channel 75, 76. The welding mark is not however limited to such a configuration. A plurality of welding marks 83 may be provided to one gas channel 81, 82 as shown in FIG. 8. More specifically, as shown in FIG. 8, the gas channel 81, 82 is defined in the air electrode insulating frame 15 with a width equal to the longer diameter of the opening 60b. The plurality of welding marks 83 are formed on the exposed region of the separator 12 inside the gas channel 81, 82 such that the welding marks 83 extend in parallel to each other in the direction of extension of the gas channel 81, 82 (as the horizontal hole part). Even in this case, it is possible to assuredly fix the exposed region of the separator 12 to the fuel electrode frame 13 and prevent deformation of the separator 12 inside the gas channel 81, 82.

Figure 9:
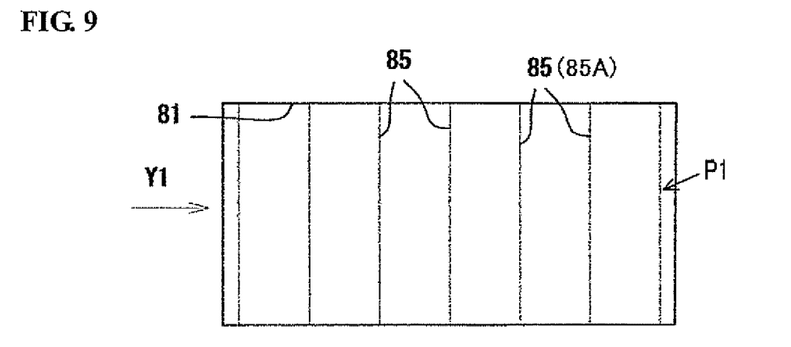
FIG. 9 is a plan view of a fuel cell cassette, in which a welding mark is formed in a direction perpendicular to a gas channel, according to another embodiment of the present invention.
Figure 10:
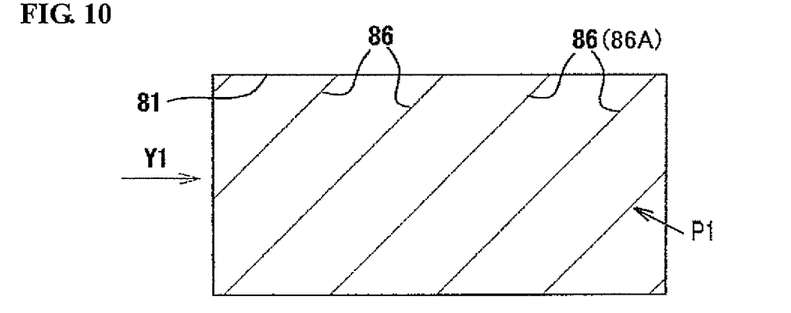
FIG. 10 is a plan view of a fuel cell cassette, in which a welding mark is formed in a direction inclined relative to a gas channel, according to another embodiment of the present invention.
Figure 11:
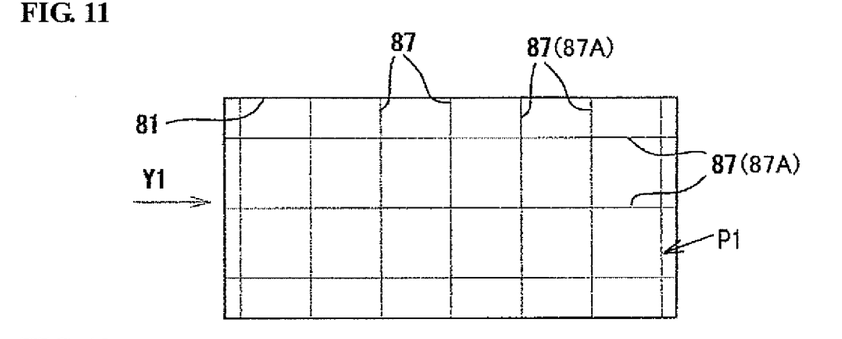
FIG. 11 is a plan view of a fuel cell cassette, in which welding marks are formed in a mesh pattern in a gas channel, according to another embodiment of the present invention.
Figure 12:
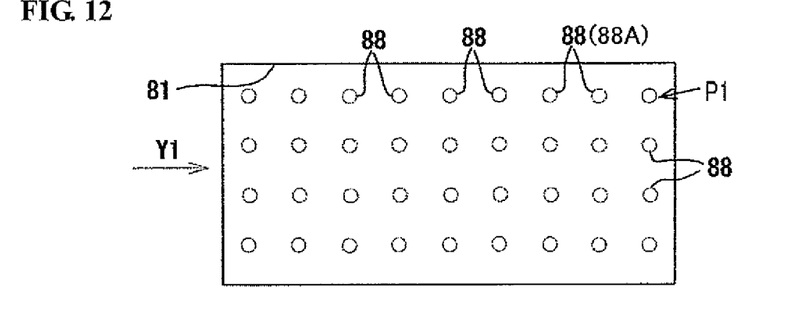
FIG. 12 is a plan view of a fuel cell cassette, in which welding marks are formed in a dot pattern in a gas channel, according to another embodiment of the present invention.

Although the linear welding mark 77, 83 is formed as the welding part in parallel to the direction of extension of the gas channel 75, 76, 81, 82 (as the horizontal hole part) in the above embodiment, linear welding marks 85 may be formed as the welding part in a direction perpendicular to the direction Y1 of extension of the gas channel 81 (as the horizontal hole part) as shown in FIG. 9. As the welding part, linear welding marks 86 may be formed in a direction inclined relative to the direction Y1 of extension of the gas channel 81 (as the horizontal hole part) as shown in FIG. 10. As shown in FIG. 11, welding marks 87 may be formed as the welding part so as to intersect longitudinally and laterally in a mesh pattern inside the gas channel 81 (as the horizontal hole part). The pattern of formation of the welding marks is not limited to such a mesh pattern. As shown in FIG. 12, welding marks 88 may be formed longitudinally and laterally at predetermined intervals in a dot pattern inside the gas channel 81 (as the horizontal hole part). By forming the plurality of welding marks 85 to 88 in one gas channel 81 as mentioned above, it is possible to assuredly fix the exposed region of the separator 12 to the fuel electrode frame 13 and prevent deformation of the separator 12 inside the gas channel 81.

Although the welding mark 77 is provided to each gas channel 75, 76 in the above embodiment, the welding mark 77 is not limited to such a configuration. It is alternatively feasible to form a relatively long linear welding mark over two or more gas channel 75, 76. In this case, the linear welding mark can be formed in a crank shape or zigzag shape such that parts of the linear welding mark are exposed inside the gas channels 75, 76. It is also possible to fix the exposed region of the separator 12 to the fuel electrode frame 13 and prevent deformation of the separator 12 inside the gas channel 75, 76 by forming the welding mark as mentioned above.

Figure 13:
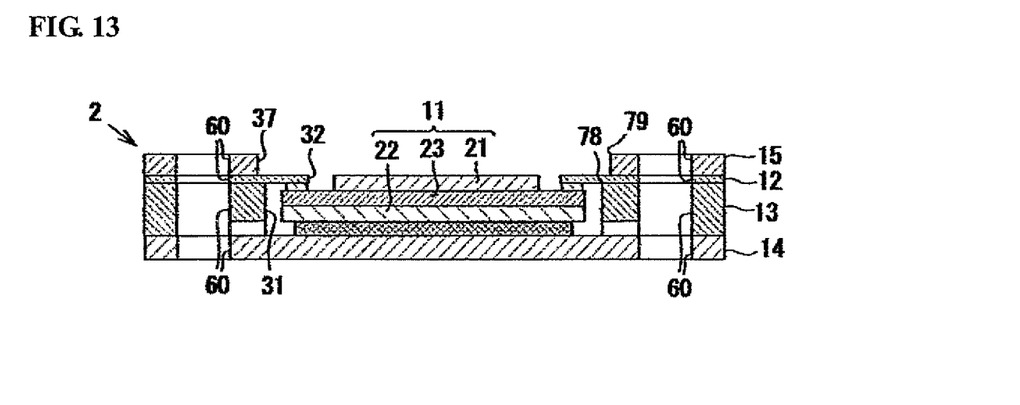
FIG. 13 is a cross-sectional view of a fuel cell cassette, in which an inner edge of a fuel electrode frame is arranged to protrude more toward the cell side than an inner edge of an air electrode insulating frame, according to another embodiment of the present invention.
Figure 14:
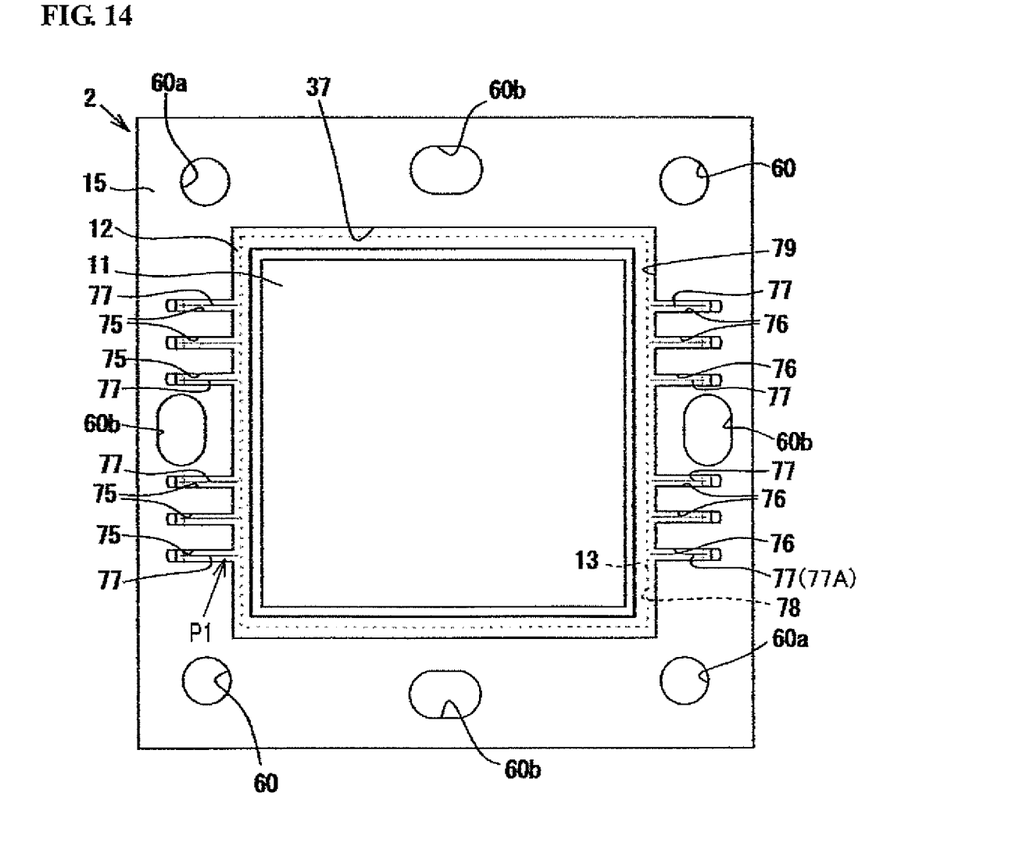
FIG. 14 is a plan view showing welding marks in the fuel cell cassette of FIG. 13.
Figure 15:
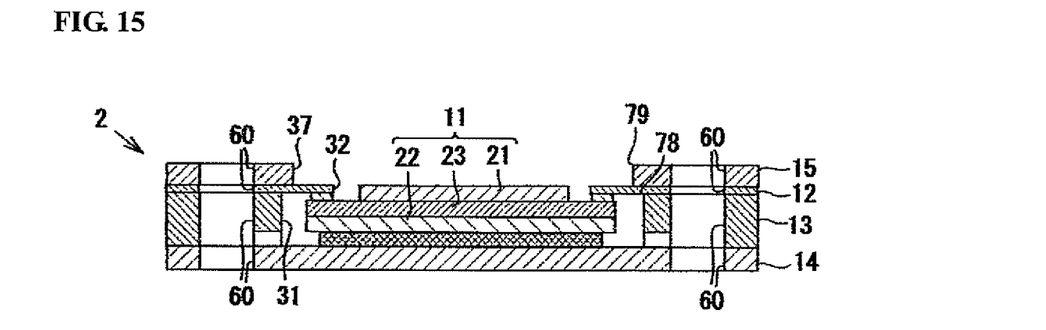
FIG. 15 is a cross-sectional view of a fuel cell cassette, in which an inner edge of an air electrode insulating frame is arranged to protrude more toward the cell side than an inner edge of a fuel electrode frame, according to another embodiment of the present invention.
Figure 16:
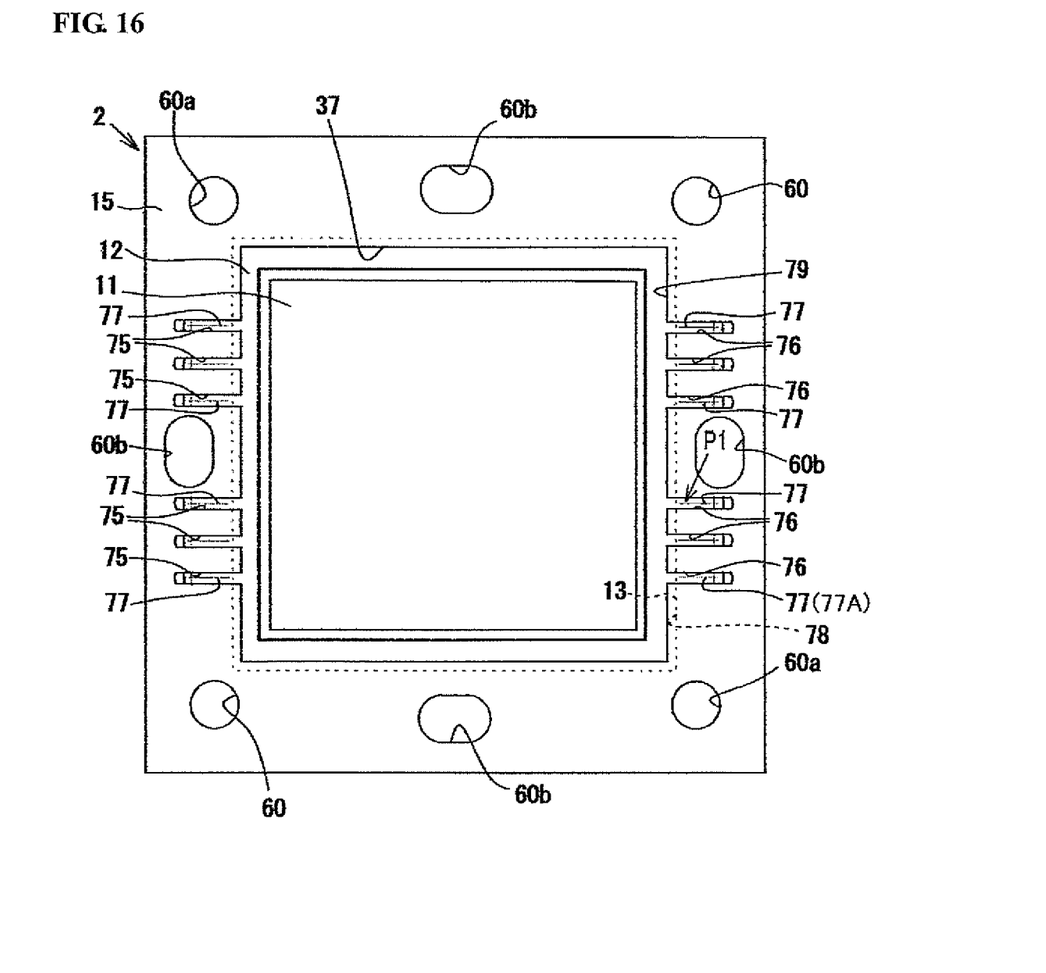
FIG. 16 is a plan view showing welding marks in the fuel cell cassette of FIG. 15.

In the above embodiment, the fuel electrode frame 13 and the air electrode insulating frame 15 are formed with the same outer shape dimensions. The fuel electrode frame 13 and the air electrode insulating frame 15 are not however limited to such dimensions. As shown in FIG. 13, the fuel electrode frame 13 and the air electrode insulating frame 15 may be formed such that the inner edge 78 of the fuel electrode frame 13 protrudes more toward the cell side than the inner edge 79 of the air electrode insulating frame 15. In such a case, the linear welding mark 77 is preferably formed on the exposed region of the separator 12 inside the gas channel 75, 76 so as to protrude more toward the cell side than the inner edge 79 of the air electrode insulating film 15 as shown in FIG. 14. This makes it possible to, in the vicinity of an outlet of the gas channel 75 or an inlet of the gas channel 76, fix the separator 12 to the fuel electrode frame 13 by the welding mark 77 and assuredly prevent deformation of the separator 12. As shown in FIG. 15, the fuel electrode frame 13 and the air electrode insulating frame 15 may alternatively be formed such that the inner edge 79 of the air electrode insulating frame 15 protrudes more toward the cell side than the inner edge 78 of the fuel electrode frame 13. In such a case, the linear welding mark 77 is preferably formed so as not to protrude more toward the cell side than the inner edge 79 of the air electrode insulating frame 15 as shown in FIG. 16. This makes it possible to avoid performing the laser welding at a location where the fuel electrode frame 13 does not exist.

Moreover, the welding mark 71, 83, 85 to 88 (welding part) is formed by the laser welding process using the fiber laser in the above embodiment. The laser welding process can be performed with the use of any laser other than the fiber laser, such as carbon dioxide gas laser or YAG laser, for the formation of the welding part. The welding part can be formed by any process other than the laser welding process, such as seamless (e.g. resistance welding), brazing or the like.

Although the fuel cell is embodied as the solid oxide fuel cell in the above embodiment, the fuel cell may be embodied any other type of fuel cell such as molten carbonate fuel cell (MCFC).

Any technical ideas understood from the above embodiment, other than the presently claimed technical ideas, will be explained below.

(1) There is provided the fuel cell cassette according to the first aspect, wherein the welding part includes a plurality of linear welding marks formed by the welding such that the welding marks intersect each other.

(2) There is provided the fuel cell cassette according to the first aspect, wherein the separator has a thickness of 0.04 mm to 0.3 mm.

(3) There is provided the fuel cell cassette according to the first aspect, wherein the gas channel in which the welding part is formed is a gas channel for flow of the oxidant gas.

(4) There is provided the fuel cell cassette according to the first aspect, wherein the first frame is a metal frame formed of a metal plate in a rectangular frame shape.

(5) There is provided the fuel cell cassette according to the first aspect, wherein the second frame is a mica frame formed of mica in a rectangular frame shape.

(6) There is provided the fuel cell cassette according to the first aspect, wherein an inner edge of the first frame is arranged to protrude more toward a cell side than an inner edge of the second frame; and wherein the welding part include a linear laser welding mark formed so as to protrude more toward the cell side than the inner edge of the second frame.

(7) There is provided the fuel cell cassette according to the first aspect, wherein an inner edge of the second frame is arranged to protrude more toward a cell side than the inner edge of the first frame; and wherein the welding mark includes a linear laser welding mark formed so as not to protrude more toward the cell side than the inner edge of the second frame.

(8) There is provided the fuel cell cassette according to the first aspect, wherein the electrolyte layer is a solid electrolyte layer formed of a solid oxide.

(9) There is provided the fuel cell stack according to the second aspect, wherein the fuel cell stack has manifolds defined in the fuel cell cassettes; the manifolds include vertical hole parts extending in a stacking direction of the fuel cell cassettes and horizontal hole parts connected to the vertical hole parts and extending in a direction perpendicular to the staking direction so as to divide or collect gas paths to the single cells; and wherein the welding parts are formed in the exposed regions of the separators inside the horizontal hole parts of the manifolds.

(10) There is provided the fuel cell stack according to the above technical idea (9), wherein the welding part includes a linear laser welding mark formed in a direction perpendicular to the direction of extension of the horizontal hole part.

(11) There is provided the fuel cell stack according to the above technical idea (9), wherein the welding part includes a linear laser welding mark formed in a direction inclined relative to the direction of extension of the horizontal hole part.

(12) There is provided the fuel cell stack according to the above technical idea (9), wherein the welding part includes laser welding marks intersecting longitudinally and laterally in a mesh pattern.

(13) There is provided the fuel cell stack according to the above technical idea (9), wherein the welding part includes laser welding marks spaced longitudinally and laterally at predetermined intervals in a dot pattern.

(14) There is provided the fuel cell stack according to the above technical idea (9), wherein the welding part includes a laser welding mark formed over a plurality of the horizontal hole parts.

(15) There is provided a method for producing the fuel cell cassette according to the first aspect, comprising: a placement step of placing the separator and the first frame such that the separators and the first frame overlap each other, with openings of the separator and the first frame being aligned with each other so as to define gas passages; and a welding step of emitting a laser beam along peripheries of the openings and thereby forming laser welding marks in a closed circuit shape so as to seal the peripheries of the openings, as well as emitting a laser beam to a region of the separator to be exposed inside the gas channel and thereby forming the welding part to fix the exposed region of the separator to the first frame.

DESCRIPTION OF REFERENCE NUMERALS

2: Fuel cell cassette
3: Fuel cell stack
11: Single cell
12: Separator
13: Fuel electrode frame as first frame
14: Interconnector
15: Air electrode insulating frame as second frame
19: One surface of separator
10: Other surface of separator
21: Air electrode
22: Fuel electrode 23: Solid electrolyte layer as electrolyte layer
34: One surface of first frame
35: Other surface of first frame
50: Fuel supply passage as gas channel
51: Fuel discharge passage as gas channel
60, 60a to 60d: Opening
72: Closed circuit-shaped welding mark
75, 76, 81, 82: Gas channel
77, 83, 85 to 88: Welding mark as welding part
L1: Laser beam

The invention claimed is:

1. A fuel cell cassette, comprising:
a single cell formed in a flat plate shape and having a fuel electrode, an air electrode and an electrolyte layer stacked together in a stacking direction;
a first frame formed in a frame shape and arranged to surround a peripheral surface of the single cell;
a separator joined to a peripheral end portion of the single cell and located on one surface of the first frame so as to separate an oxidant gas contacting the air electrode and a fuel gas contacting the fuel electrode; and
an interconnector formed in a plate shape and located on the other surface of the first frame opposite to the one surface on which the separator is located,
wherein the separator and the first frame are joined by welding such that the first frame is located on one surface of the separator;
wherein the fuel cell cassette comprises:
a second frame located on the other surface of the separator which is opposite from the first frame in the stacking direction, the second frame having defined therein gas channels through which the oxidant gas or the fuel gas flows; and
a welding part formed on an exposed region of the separator inside the gas channel so as to fix the exposed region of the separator to the first frame; and
wherein the entire first frame consists of metal and the entire second frame consists of an insulating material,
wherein each of the first frame and the second frame has a monolithic structure; and
wherein the first frame and the second frame are separately provided and spaced apart from each other.

2. The fuel cell cassette according to claim 1, wherein the welding part inside the gas channel includes a plurality of welding marks formed by the welding.

3. The fuel cell cassette according to claim 1, wherein a thickness of the separator is smaller than a thickness of the interconnector.

4. The fuel cell cassette according to claim 1, wherein the welding part includes a linear welding mark formed by the welding in parallel to a direction of extension of the gas channel.

5. The fuel cell cassette according to claim 1,
wherein the first frame and the separator have openings made therein so as to define gas passages through which the oxidant gas and the fuel gas flow;
wherein the fuel cell cassette comprises welding marks formed by welding so as to enclose and seal peripheries of the openings; and
wherein the welding part includes a linear welding mark formed by the welding so as to intersect the welding mark formed around the periphery of the opening.

6. The fuel cell cassette according to claim 1, wherein the welding is laser welding.

7. A fuel cell stack comprising a plurality of the fuel cell cassettes according to claim 1.

8. The fuel cell cassette according to claim 1, wherein the second frame is formed of mica.

* * * * *